C. L. FLORA.
AUTOMOBILE STEERING GEAR.
APPLICATION FILED MAR. 25, 1916.

1,193,133.

Patented Aug. 1, 1916.
2 SHEETS—SHEET 1.

INVENTOR
Charles L. Flora.
by
Owen, Owen & Crampton.

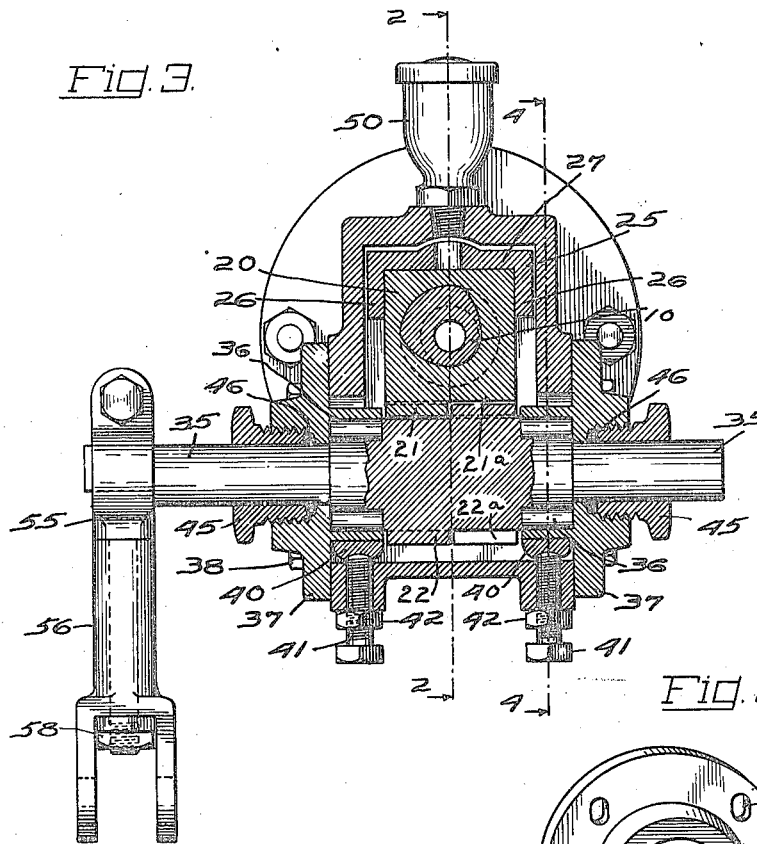
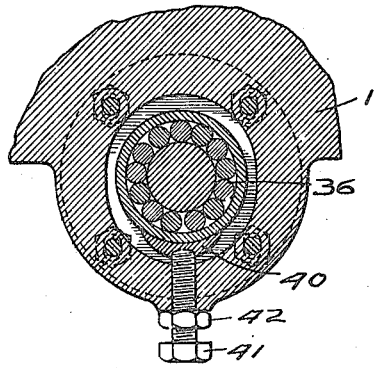
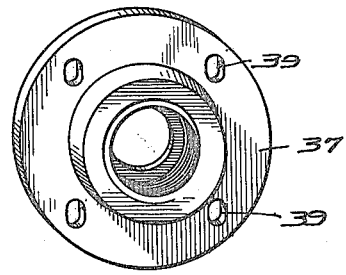

UNITED STATES PATENT OFFICE.

CHARLES L. FLORA, OF TOLEDO, OHIO, ASSIGNOR OF ONE-HALF TO FRED N. LAUBENTHAL, OF TOLEDO, OHIO.

AUTOMOBILE STEERING-GEAR.

1,193,133.     Specification of Letters Patent.     Patented Aug. 1, 1916.

Application filed March 25, 1916. Serial No. 86,675.

*To all whom it may concern:*

Be it known that I, CHARLES L. FLORA, a citizen of the United States, and a resident of Toledo, in the county of Lucas and State of Ohio, have invented a certain new and useful Automobile Steering-Gear; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to automobile steering gears and it has for its object to provide a mechanism for shifting the connecting bar which connects the knuckles of the stub axles of the front wheels of an automobile with perfect ease without lost motion, and yet by a mechanism that will not be deflected or shaken by irregularities such as ruts and stones of the road.

It has for its object to provide a mechanism that will not only produce these results but also will not develop lost motion between the connecting rod of the knuckles and the steering sleeve or rod.

A further object of the invention is to produce a steering mechanism interconnected by gear teeth which are so constructed and arranged that the pressure brought to bear between them will be received on a large area supported by a correspondingly large cross-section of the structure to prevent wearing, breaking and to produce long life in the steering gear.

The invention has for its object the improvement of other features of construction and to produce functions and operations not heretofore found in automobile steering mechanisms.

The invention may be contained in many forms of constructions, usable for steering conveyances of any form, all of which come within the purview of my claims hereinafter appended. To show the practicability of my invention I have selected one of such constructions as an example and shall describe it hereinafter. The construction selected is illustrated in the accompanying drawings.

Figure 1:
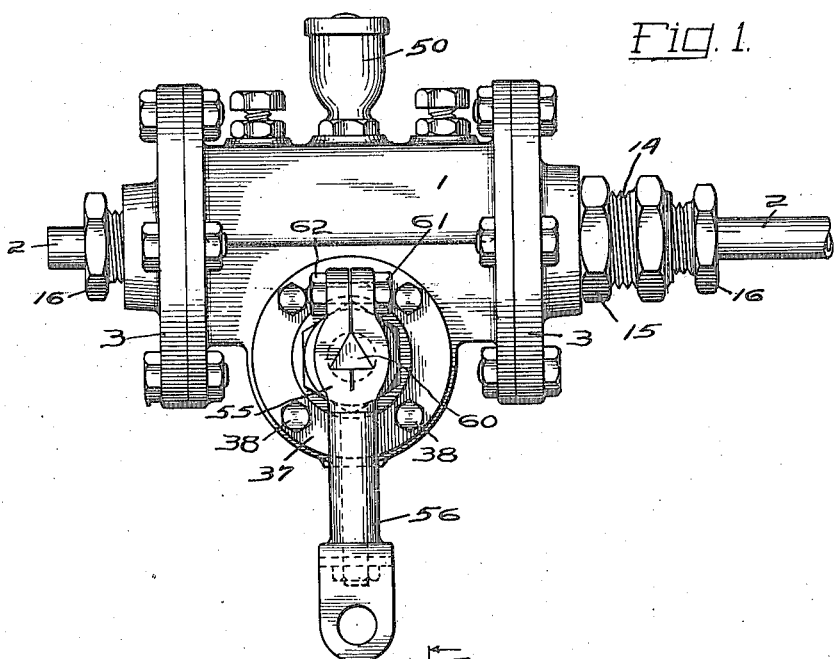
Figure 2:
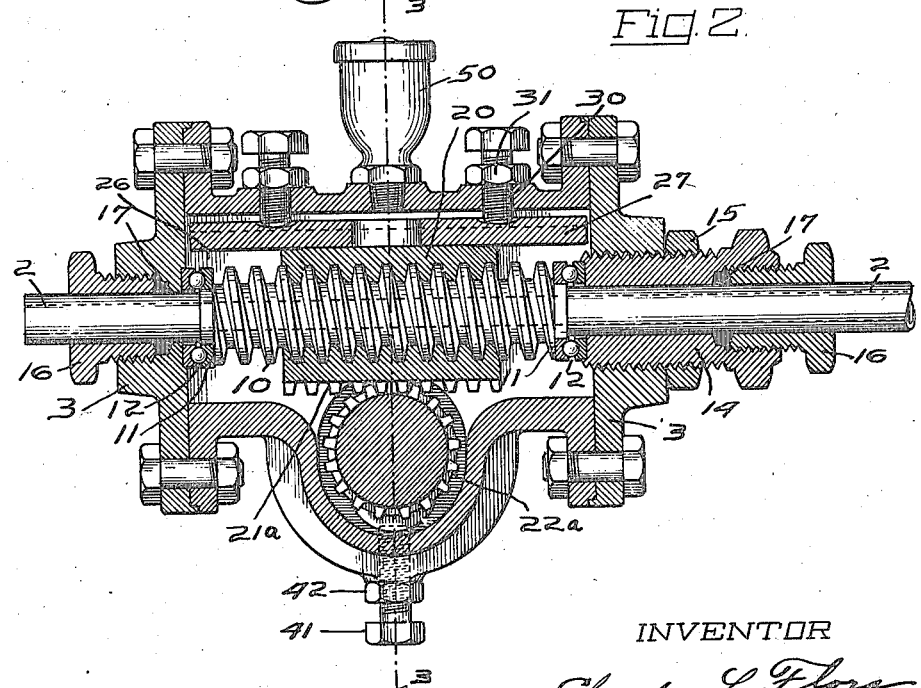

Figure 1 of the drawings is a side view of the construction selected. Fig. 2 is a sectional view of the construction illustrated in Fig. 1, taken on the line 2—2 indicated in Fig. 3. Fig. 3 is a sectional view taken on the line 3—3 indicated in Fig. 2. Fig. 4 is a section of the part of the construction taken on the line 4—4 indicated in Fig. 3. Fig. 5 is a roller bearing cap.

1, Fig. 1, is the shell or casing for containing a part of the mechanism.

2 is a steering rod or sleeve which is connected to the steering wheel or other manually operated means for steering the conveyance in which the mechanism may be mounted.

3, 3 are cap plates or heads which close the shell 1 and through which the sleeve 2 extends.

A worm gear or screw 10 is keyed, welded to, or forms a part of the sleeve 2 and extends substantially the length of the interior of the casing 1. It is provided with shoulders 11, 11 and thrust bearings 12, 12 are located so as to receive the thrust of the screw 10 when it is turned against a force pressed longitudinally with respect to the worm gear and the sleeve 2. One thrust bearing 12 is located intermediate the shoulder 11 and one end plate 3, while the other thrust bearing 12 is located intermediate the other shoulder 11 and a threaded plug 14 which is threaded into the other end plate 3. The threaded plug 14 is a little larger in diameter than the worm gear 10. The plug 14 is locked in position by means of the lock nut 15. The sleeve 2 extends not only through the casing and through the plug 14, but also through the packing boxes formed in one of the plates 3 and in the end of the plug 14. The packing box is closed by means of threaded plugs 16, which compress the packing material 17, 17 that surrounds the sleeve 2, to keep grease, oil, or graphite within the casing 1.

A block 20 is located on the worm gear 10. The worm gear or screw 10 threads into the block 20 and when the sleeve 2 is rotated the block 20 is shifted along the screw 10. The underside of the block 20 is provided, in the present instance, with two racks 21 and 21$^a$, which operate spur gears 22 and 22$^a$, respectively. The teeth of the racks 21 and 21$^a$ and also the teeth of the gears 22 and 22$^a$ are preferably arranged in staggered relation, so that any wear or lost motion between the rack and gear of one set is compensated for by the other set. A housing 25 surrounds three sides of the block 20. It has two wings 26, 26 located on opposite sides of the block 20 and the top 27 is located above the block 20. The housing extends the length of the interior of the shell 1. The top of the housing 27 may bear against the top of the casing 1, or it may be adjusted with relation to the top of the shell 1 and held in its adjusted position by means of the threaded screws 30 which are locked by means of the nuts 31. This adjusts the block 20 with respect to the spur gear 22.

The spur gear 22 is connected to or forms a part of the spindle or shaft 35. The shaft or spindle is supported in roller bearings 36 located in bearing caps 37, which are bolted on to the side of the shell 1 and close openings of sufficient size to permit the withdrawal of the spur gear 22. The caps 37 are bolted to the casing 1 by means of bolts 38 which extend through oblong openings 39 located in each of the bearing caps 37. The position of the caps 37 and consequently the position of the spur gear 22 with reference to the block 20 is adjusted by means of the pillows 40 which are supported by the adjustment screws 41. The adjustment screws 41 are locked in position by means of the nuts 42. The oblong openings 39 permit a limited movement of the bearing caps 37 and consequently of the spur gear 22, for purposes of adjustment of the spur gear with reference to the block 20.

The cap plates 37 are also provided with packing boxes which are closed by means of the plugs 45 and contain suitable packing material 46. An oil cup 50 may be placed in the top of the casing 1 for the purpose of oiling the mechanism contained therein. The casing may be packed with grease and by reason of the tight fitting packing boxes the parts will be kept lubricated indefinitely.

The shaft 35 is connected to the steering knuckles or other steering mechanism of the conveyance. An arm 55 is located on one end of the shaft 35. It may be provided with a swiveled portion 56 for connecting the shaft 35 with a link which will permit a certain amount of free play, such as lateral movement of the link relative to the casing 1. The swiveled portion 56 is secured in position by means of the nut 58.

The end of the shaft 35 may be provided with a triangular formed portion 60 over which the arm 55 may be slipped and clamped by the bolt 61, which is secured by the nut 62, the end of the arm 55 being split for the purpose of securing it to the end of the shaft 35. The triangular end of the shaft 35 provides a means for not only keying the arm 55 but also a means whereby the spur gear 22 may be definitely shifted relative to the block 20, to cause the spur gear 22 to wear at certain definite points and to prevent overlapping of the portions operated upon by the block 20, thus greatly extending the life of the mechanism.

The construction selected and described may be greatly modified in the arrangement and manufacture of its parts and in the substitution of elements having equivalent functions and such modifications may be used for many varied purposes and still contain the invention.

Having thus described my invention, what I claim as new, and desire to secure by Letters Patent, is,—

1. In a steering gear, a casing, a screw, a block threaded on the screw, a housing for containing the block and forming a bearing for the block, means for adjusting the housing in the casing to vary the pressure of the housing on the block, and means connecting the block with the steering mechanism of the conveyance.

2. In a steering gear, a casing, a screw, the block threaded on the screw, a housing for containing the block and forming a bearing for three sides of the block, means for adjusting the housing in the casing to vary the pressure of the housing on the block, and means connecting the block with a steering mechanism of the conveyance.

3. In a steering gear, the combination of a screw, a block threaded on the screw, a rack located on the block, a spur gear operated by the rack, spindles for supporting the spur gear, roller bearing blocks surrounding the spindles and for supporting the spindles, and adjustable pillows for supporting the roller bearing blocks and the spur gear and adjusting the spur gear relative to the rack.

4. In a steering gear, the combination of a screw, a block threaded on the screw, a rack located in the block, a spur gear operated by the rack, spindles for supporting the spur gear, a casing for inclosing the screw, the block and the spur gear, caps for supporting the spindles and secured to the casing on opposite sides thereof, the caps having inwardly extending flanges, and roller bearings located intermediate the spindles and the flanges for supporting the spindles and the spur gear, and means for adjusting the position of the caps.

5. In a steering gear, the combination of a screw, a block threaded on the screw, a rack located on the block, a spur gear operated by the rack, spindles for supporting the spur gear, a casing for inclosing the screw, the block and the spur gear, caps for supporting the spindle, bolts for securing the caps on opposite sides of the casing, and means for adjusting the position of the caps.

6. In a steering gear, the combination of a screw, a block threaded on the screw, a rack located on the block, a spur gear operated by the rack, spindles for supporting the spur gear, a casing for inclosing the screw, the block and the spur gear, caps for supporting the spindle, bolts for securing the caps on opposite sides of the casing, and means for adjusting the position of the caps, the caps having oblong slots for adjustment of the caps, and the spur gear supported by the caps.

7. In a steering gear, the combination of a screw, a block threaded on the screw, a rack located in the block, a spur gear operated by the rack, spindles for supporting the spur gear, a casing for inclosing the screw, the block and the spur gear, caps for supporting the spindles and secured to the casing on opposite sides thereof, the caps having inwardly extending flanges, and roller bearings located intermediate the spindles and the flanges for supporting the spindles and the spur gear, pillows for supporting the bearing caps, the bearing caps having packing boxes for sealing the interior of the casing, set screws for securing the pillows in position and set screws for securing the bearing housing in position relative to the block.

In testimony whereof, I have hereunto signed my name to this specification.

CHARLES L. FLORA.